Nov. 26, 1935.  F. W. PAFFEN  2,022,384
LIQUID SEAL
Filed March 8, 1932
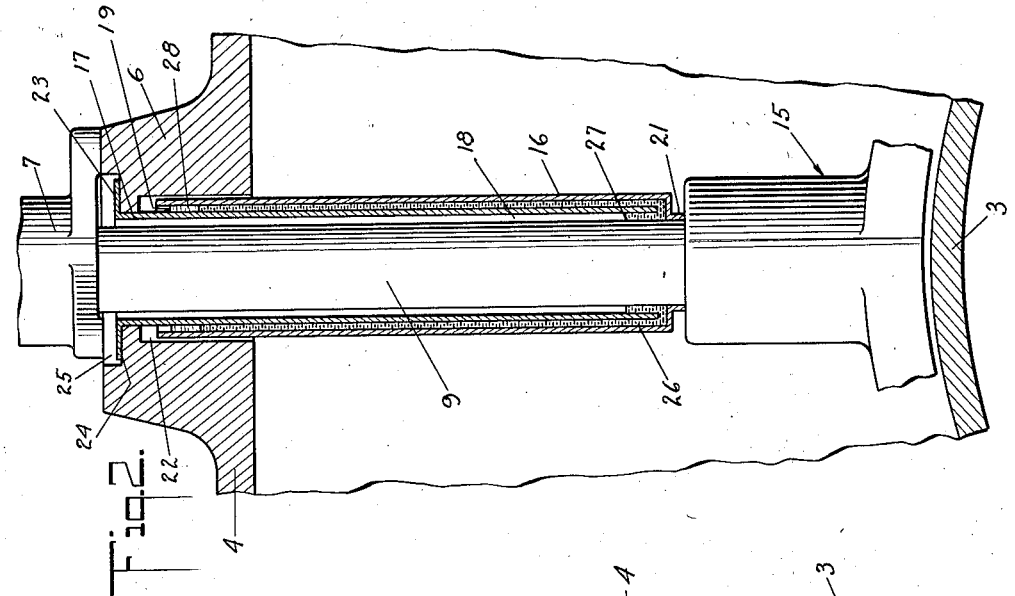
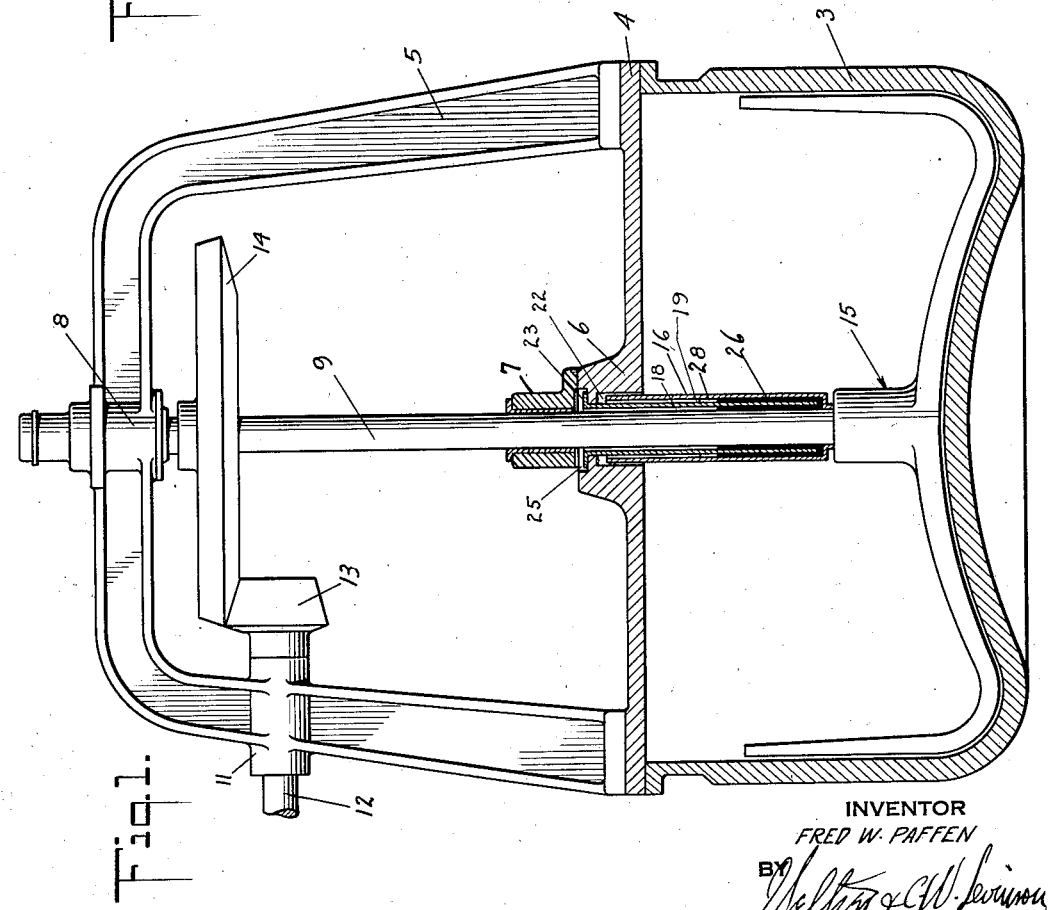
INVENTOR
FRED W. PAFFEN
ATTORNEYS Patented Nov. 26, 1935

2,022,384

UNITED STATES PATENT OFFICE 2,022,384

LIQUID SEAL

Fred. W. Paffen, Forest Hills, N. Y., assignor to Celanese Corporation of America, a corporation of Delaware Application March 8, 1932, Serial No. 597,496

4 Claims. (Cl. 259—122)

The present invention relates to improvements in machines for mixing or agitating materials under treatment and relates more particularly to liquid seals for use in such machines.

Machines of this type usually comprise a vessel within which is a stirrer or agitator mounted on and rotated by a vertical shaft which extends through the cover of said vessel. The shaft is journaled in bearings formed in the cover of the vessel and in the yoke of the machine. Since chemical reactions are often carried out in such a machine, the shaft bearing in the cover is made in the form of a stuffing box in order to prevent leakage of fumes, etc. around the shaft and also to maintain the required vacuum or pressure within the vessel. This stuffing box is of the usual construction and comprises two bushings, one of which forms a support for the packing and the other rests on the packing and cooperates with the gland for compressing the said packing. The bushings of course also serve as bearings for the shaft.

The stuffing box above outlined possesses many disadvantages. For example, a stuffing box requires frequent attention in order that it may retain its effectiveness as a seal. It will be readily seen that due to the rotation of the shaft the packing will become worn and glazed thus causing leakage around the shaft, which leakage is temporarily stopped by screwing down the gland to further compress the packing, as is well understood in the art. Again when reactions involving the giving off or the use of heat take place within the vessel, the heat dries the lubricant in the stuffing box thus causing the packing to become hard and brittle whereby the shaft is often scored.

Other factors which contribute to lower considerably the efficiency of the stuffing box in a machine of the type referred to are the ease, relatively speaking, with which dust enters the bearings, the metal of the bearings being attacked by acid fumes and the necessity for dismounting the whole bearing structure for the purpose of examining the shaft.

It is an object of this invention to provide an improved sealing arrangement which will be free from the above mentioned and other disadvantages and which will be simple in construction and efficient in operation.

In one aspect the invention comprises the provision in a mixing machine of the so-called vertical type of a liquid seal wherein mercury is employed as the sealing medium. The employment of a mercury seal permits of the adoption of an improved cover construction whereby the lower bearing for the shaft is placed wholly without the vessel and above the seal thus putting the bearing beyond the reach of heat and acid fumes with their destructive action.

An object of this invention is to provide a seal which will require no lubrication and which will eliminate wear, due to friction, on the shaft.

A further object of this invention is the provision in a mixing machine of a sealing medium comprising two immiscible liquids, one of which is adapted to act as a protective medium for the other.

Other objects of this invention, together with certain details of construction and combinations of parts, will be described in the specification and pointed out in the appended claims.

In the accompanying drawing:

Fig. 1 is a vertical cross-sectional view of a mixing machine embodying my invention, the liquid in the seal being shown in the position it assumes when the vessel is under normal atmospheric pressure; and Fig. 2 is an enlarged detailed view, partly in cross-section, of the seal construction showing the position of the liquid in the seal when the interior of the vessel is under vacuum.

Referring to the drawing, there is shown a mixing machine of the vertical type comprising a vessel 3 having a cover 4 secured thereon. The vessel and cover are made of any suitable material, but preferably of acid resistant material. Means (not shown) are provided in the cover and vessel for charging and discharging the contents of the vessel. Suitably fastened to the cover is a yoke 5.

An integral boss 6 is formed on the cover and a bearing 7 is secured thereto by any suitable means, for example by means of lugs. A bearing 8 is formed in the yoke 5 and a vertical shaft 9 is journaled in bearings 7 and 8. The yoke is also provided with a bearing 11 in which is journaled a stub shaft 12 of the drive pinion 13, rotation being applied to said pinion by any suitable prime mover. The drive pinion 13 cooperates with a bevel gear wheel 14 fixed to shaft 9 for rotating the said shaft.

To provide agitation of the material in the vessel, the lower end of the shaft 9 has keyed thereon a stirrer arm structure, generally indicated by the reference numeral 15, which is preferably made of acid resisting metal.

As mixing machines of this type are frequently employed for carrying out, under vacuum or pressure, chemical actions which may give off obnoxious or corrosive vapors, I have provided an improved seal for the purpose of preventing the escape of vapors and/or maintaining the required degree of vacuum or pressure within the vessel. Referring particularly to Fig. 2, it will be seen that the seal comprises an annular tube 16 and an annular tube 17 telescopically arranged within each other, which surround and are spaced from the shaft 9 forming two annular, interconnecting spaces 18 and 19, the purpose of which will hereinafter be described. These tubes may be made of any suitable material but I prefer to make them of nickel.

The lower end 21 of outer tube 16 is reduced in cross-section and is sealed to shaft 9 by welding or by shrinking on. The upper end of this tube is left open and extends into an annular recess 22 formed in the under side of boss 6. The inner tube 17 is provided with a flange 23 which is sealed to the shoulder 24 in the annular recess 25 formed in the upper surface of boss 6. The inner tube 17 is of such length that its lower end is spaced from the bottom of tube 16 thus interconnecting the spaces 18 and 19. The seal is completed by pouring a predetermined quantity of mercury 26 into these spaces through the recess 25. When the vessel is under normal atmospheric pressure, the mercury will, of course, rise to equal levels in each of the spaces 18 and 19, as is shown in Fig. 1. However, when a vacuum is applied within the vessel, the mercury will descend in space 18 and rise in space 19 as will be readily understood.

The length of these tubes will necessarily depend upon the condition of vacuum or pressure under which the apparatus is intended to operate. In machines intended to work under a vacuum up to thirty inches of mercury, or a pressure not exceeding one atmosphere, the length of the tube should be substantially thirty-two inches above the lower mercury level shown at 27 in Fig. 2, the additional two inches over that theoretically necessary being for a purpose hereinafter set forth. It will be readily understood that where apparatus is designed for operating under a lower degree of vacuum or under normal atmospheric pressure, the tubes may be shorter in length. Where pressures greater than one atmosphere are to be employed, the tubes must of course be longer to hold a higher column of mercury. The spaces 18 and 19 need not be greater than one-eighth of an inch in order that a minimum quantity of mercury may be used.

For the purpose of preventing any possible reaction between the mercury and the chemical reagents in the vessel, a layer 28 of some substance not affected by the reagents, such as a heavy petroleum oil, may be placed on the mercury in space 19. This protective layer of oil is preferably about one and one-half inches in depth.

It will thus be seen that I have produced a seal construction which possesses many advantages. The feature of extending the seal into the cover of the vessel prevents dust and other foreign matter from reaching the open end of the seal, the space between tube 16 and the walls of the recess 22 being as small as possible. Another advantage of my invention is the fact that the vertical shaft 9 can be made of ordinary inexpensive cold rolled steel since the shaft is effectively isolated from the corrosive reaction vapors by the seal and the tubes which are made from acid resisting metal, thus obviating the necessity of using expensive acid resistant metal for the shaft.

Furthermore, the form of seal above described, permits of the placing of the lower bearing 7 of the shaft 9 in an accessible position above the cover of the vessel without materially increasing the free unsupported length of the shaft below this bearing. This lower bearing accordingly can be more easily maintained and renewed without affecting or disturbing the seal.

The foregoing detailed description is given merely by way of illustration and many variations may be made therein without departing from the spirit of my invention.

Having described my invention, what I desire to secure by Letters Patent is:

1. In a device of the character described, the combination with a vessel, a cover therefor and a rotatable shaft passing through said cover, of means for preventing the passage of fluid through the space between said shaft and said cover, said means comprising a tube fixed directly to the part of said shaft within said vessel, a second tube open to the atmosphere, said tubes being so constructed and arranged as to form a U-shaped compartment, and a plurality of liquids in said compartment.

2. In a device of the character described, the combination with a vessel, a cover therefor and a rotatable shaft passing through said cover, of means for preventing the passage of fluid through the space between said shaft and said cover, said means comprising a tube fixed directly to the part of said shaft within said vessel, a second tube open to the atmosphere, said tubes being so constructed and arranged as to form a U-shaped compartment, and a plurality of immiscible liquids in said compartment.

3. A mixing machine comprising a vessel, a cover therefor, a vertical extending shaft passing through said cover and carrying a stirrer arm at its lower extremity, bearings for said shaft, said bearings being located outside of said vessel, and means for preventing the passage of fluid through the space between the shaft and the cover, said means comprising a tube fixed about the shaft, said tube being open to the atmosphere in the vessel, a second tube within the first tube, said second tube being open to the atmosphere outside the vessel, the arrangement being such that it functions as a U-tube with one limb open to the outer atmosphere and the other open to the atmosphere inside of the vessel, and a heavy liquid and a lighter chemically inert liquid in the annular space formed by the said tubes.

4. A mixing machine comprising a vessel, a cover therefor, a vertical extending shaft passing through said cover and carrying a stirrer arm at its lower extremity, bearings for said shaft, said bearings being located outside of said vessel, and means for preventing the passage of fluid through the space between the shaft and the cover, said means comprising a tube fixed about the shaft, said tube being open to the atmosphere in the vessel, a second tube within the first tube, said second tube being open to the atmosphere outside the vessel, the arrangement being such that it functions as a U-tube with one limb open to the outer atmosphere and the other open to the atmosphere inside of the vessel, and mercury and a liquid hydrocarbon in the annular space formed by the said tubes.

FRED. W. PAFFEN.